US007507332B2

(12) United States Patent   (10) Patent No.: US 7,507,332 B2
Henkin et al.   (45) Date of Patent: Mar. 24, 2009

(54) SWIMMING POOL CLEANER DEBRIS CONTAINER

(75) Inventors: Melvyn L. Henkin, Ventura, CA (US); Jordan M. Laby, Ventura, CA (US)

(73) Assignee: Henkin-Laby, LLC, Ventura, CA (US)

( * ) Notice: Subject to any disclaimer, the term of this patent is extended or adjusted under 35 U.S.C. 154(b) by 164 days.

(21) Appl. No.: 11/632,807

(22) PCT Filed: Jul. 20, 2005

(86) PCT No.: PCT/US2005/025757

§ 371 (c)(1), (2), (4) Date: Jan. 17, 2007

(87) PCT Pub. No.: WO2006/014746

PCT Pub. Date: Feb. 9, 2006

(65) Prior Publication Data

US 2008/0078714 A1   Apr. 3, 2008

(51) Int. Cl.
E04H 4/16 (2006.01)
B01D 29/27 (2006.01)

(52) U.S. Cl. ............... 210/167.17; 210/416.2; 210/448; 15/1.7

(58) Field of Classification Search .............. 210/167.1, 210/167.17, 416.1, 416.2, 448; 15/1.7
See application file for complete search history.

(56) References Cited

U.S. PATENT DOCUMENTS

| | | | |
|---|---|---|---|
| 2,039,741 A | 5/1936 | Richards | |
| 2,421,067 A * | 5/1947 | Howe | 383/92 |
| 2,989,185 A | 6/1961 | Lombardi | |
| 3,291,145 A | 12/1966 | Ameson | |
| 3,767,055 A | 10/1973 | Flatland | |
| 3,931,740 A | 1/1976 | Carter | |
| 4,040,864 A | 8/1977 | Steeves | |
| 4,089,074 A | 5/1978 | Sermons | |
| 4,140,634 A | 2/1979 | Harry | |
| 4,429,429 A | 2/1984 | Altschul | |
| 4,558,479 A | 12/1985 | Greskovics et al. | |

(Continued)

FOREIGN PATENT DOCUMENTS

JP   54-009457   1/1979

(Continued)

OTHER PUBLICATIONS

International Search Report of the International Searching Authority dated Oct. 25, 2005, issued in connection with international Patent Application PCT/US2005/025757.

(Continued)

*Primary Examiner*—Fred Prince
(74) *Attorney, Agent, or Firm*—Freilich, Hornbaker & Rosen

(57) ABSTRACT

A pool cleaner debris bag (18) having an access opening (24) and a closure means (25) operable to close the access opening (24) for collecting debris or open the access opening (24) for emptying debris from the bag (18). The closure means (25) includes a clamp member (50) having clamping edges (56) for squeezing together bag layers (28, 29) to close the access opening (24). The closure means (25) is buoyant in water for orienting the bag to avoid impeding cleaner body (6) travel.

17 Claims, 12 Drawing Sheets

U.S. PATENT DOCUMENTS

| | | | |
|---|---|---|---|
| 4,575,423 A | 3/1986 | Alanis et al. | |
| 4,589,986 A | 5/1986 | Greskovics et al. | |
| 4,604,757 A | 8/1986 | Yokomatsu | |
| 4,618,420 A | 10/1986 | Alanis | |
| 4,653,214 A | 3/1987 | Cline | |
| 4,746,424 A | 5/1988 | Drew | |
| 4,768,532 A | 9/1988 | Johnson | |
| 4,856,913 A | 8/1989 | Campbell | |
| 4,880,531 A * | 11/1989 | Blake et al. | 210/167.17 |
| 4,889,622 A | 12/1989 | Newcombe-Bond | |
| 5,077,853 A | 1/1992 | Campbell | |
| 5,143,605 A | 9/1992 | Masciarelli | |
| 5,264,122 A | 11/1993 | Lakotish | |
| 5,279,728 A | 1/1994 | Weiss | |
| 5,350,508 A | 9/1994 | Van der Watt | |
| 5,422,001 A | 6/1995 | Yagoda et al. | |
| 5,454,940 A | 10/1995 | Lakotish | |
| 5,498,348 A | 3/1996 | Plink et al. | |
| 5,705,058 A | 1/1998 | Fischer | |
| 5,779,894 A | 7/1998 | Martensson | |
| 5,788,850 A | 8/1998 | Tuomey | |
| 5,911,878 A | 6/1999 | Benvenuto et al. | |
| 5,985,156 A | 11/1999 | Henkin et al. | |
| 5,996,906 A | 12/1999 | Cooper | |
| 6,039,886 A | 3/2000 | Henkin et al. | |
| 6,063,270 A | 5/2000 | d'Offay | |
| 6,074,553 A | 6/2000 | Haski | |
| 6,090,219 A | 7/2000 | Hinkin et al. | |
| 6,193,885 B1 | 2/2001 | Campbell | |
| 6,280,611 B1 | 8/2001 | Henkin et al. | |
| 6,358,410 B1 | 3/2002 | Lambert | |
| 6,365,039 B1 | 4/2002 | Henkin et al. | |
| 6,387,250 B1 | 5/2002 | Henkln et al. | |
| 6,412,133 B1 | 7/2002 | Erlich et al. | |
| 6,473,928 B1 | 11/2002 | Veloskey et al. | |
| 6,601,255 B1 | 8/2003 | van der Meyden et al. | |
| 6,652,742 B2 | 11/2003 | Henkin et al. | |
| 6,685,843 B2 | 2/2004 | Leaverton | |
| RE38,479 E | 3/2004 | Henkin et al. | |
| 6,743,367 B2 | 6/2004 | Dreyer | |
| 6,802,963 B2 | 10/2004 | Campbell | |
| 2005/0279682 A1 | 12/2005 | Davidson et al. | |
| 2007/0289906 A1* | 12/2007 | Gopalan | 210/121 |

FOREIGN PATENT DOCUMENTS

| | | |
|---|---|---|
| JP | 54-015365 | 5/1979 |
| JP | 54-056251 | 5/1979 |
| WO | WO 97/01689 | 1/1997 |
| WO | WO 97/49504 | 12/1997 |
| WO | WO 99/33582 | 7/1999 |
| WO | WO 99/34007 | 7/1999 |
| WO | WO 2006/014746 A1 | 2/2006 |

OTHER PUBLICATIONS

Written Opinion of the International Searching Authority dated Oct. 25, 2005, issued in connection with International Patent Application No. PCT/US2005/025757.

* cited by examiner

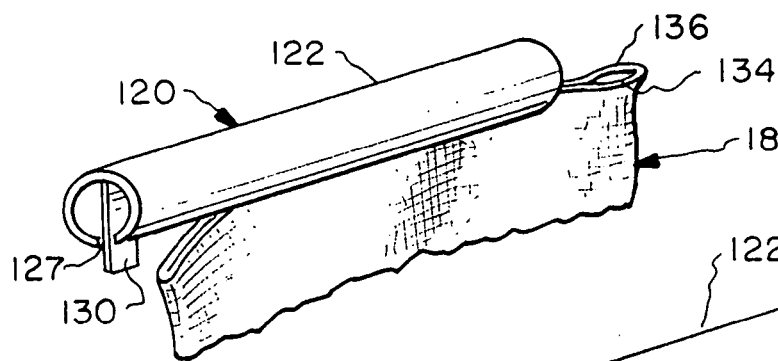
Fig. 9A
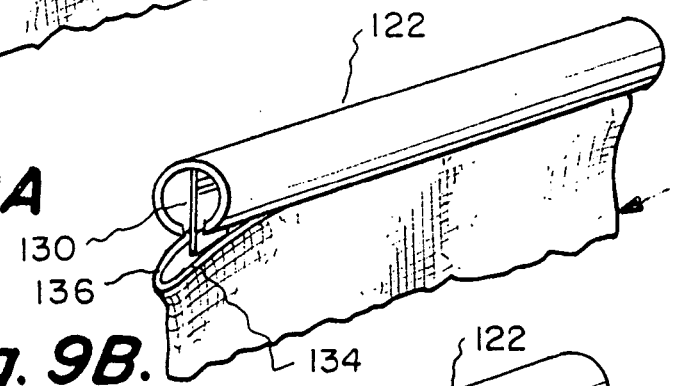
Fig. 9B.
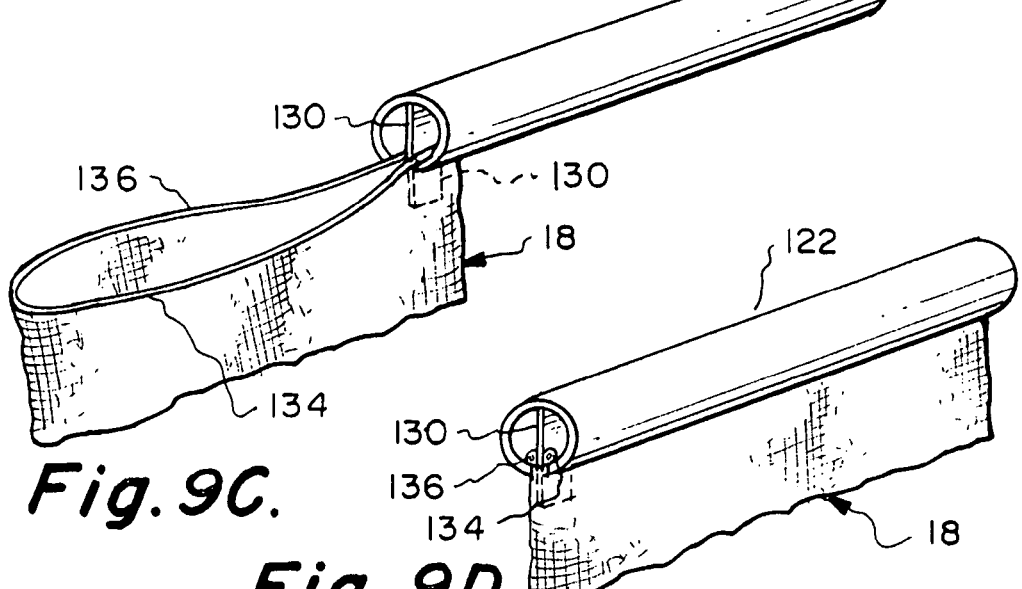
Fig. 9C.
Fig. 9D.
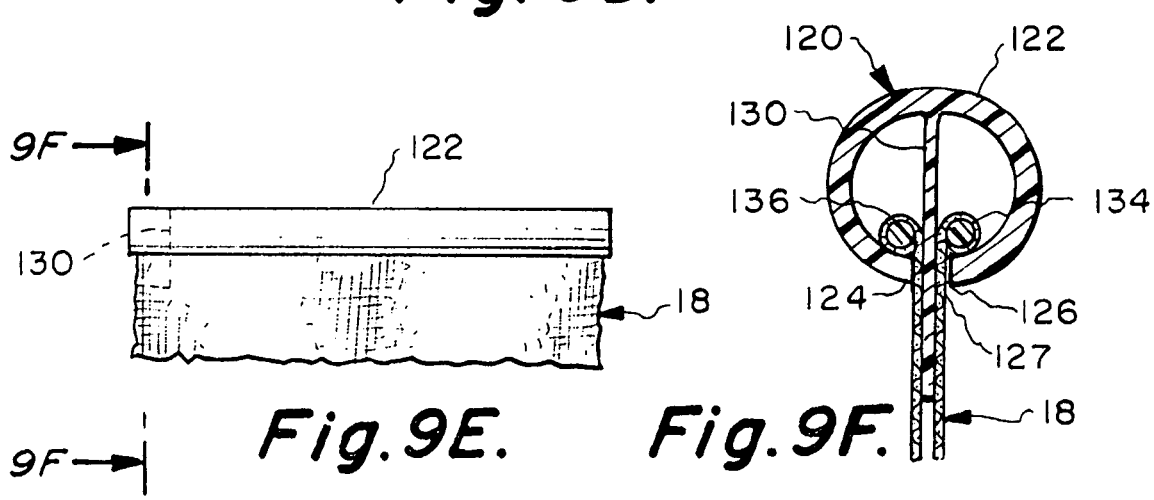
Fig. 9E.
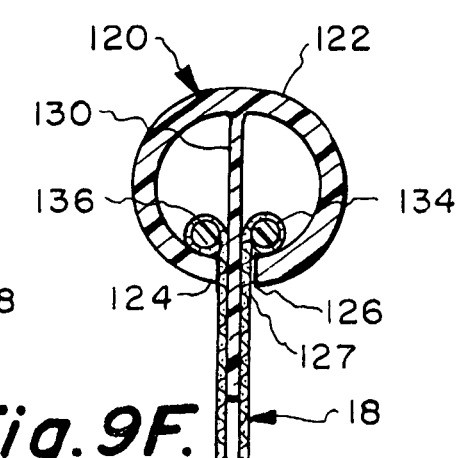
Fig. 9F.

SWIMMING POOL CLEANER DEBRIS CONTAINER

FIELD OF THE INVENTION

This invention relates generally to automatic swimming pool cleaners and more particularly to a debris collection container particularly suited for use with a positive pressure swimming pool cleaner.

BACKGROUND OF THE INVENTION

Positive pressure automatic swimming pool cleaners are widely commercially available and are described in many patents (for example, see applicant's U.S. Pat. Nos. 6,090,219 and 6,365,039). Such cleaners typically include a cleaner body configured to travel underwater along the interior surface of a pool containment wall (which generally includes both a substantially horizontal floor portion and a substantially vertical sidewall portion) and/or along the pool water surface, driven by a supplied positive pressure water flow. A debris container, typically comprising a bag formed of water permeable material, is generally carried by the cleaner body for collecting leaves, sand, and other debris captured by the cleaner body as it travels through the pool.

A typical prior art debris bag has an entrance opening configured for removable attachment to the cleaner body and an access opening (generally along a top or side seam) which is sealed during normal cleaning operation but which can be selectively opened by a user to remove debris from the bag. Such a prior art debris bag is typically provided with cooperating hook and loop fastener strips, e.g., Velcro, to allow the user to open and then reseal the bag access opening. Unfortunately, the debris discarded from the bag tends to clog the hook and loop fastener strips which, after extensive use, lose their ability to properly reseal the bag.

Debris bags for pool cleaners are preferably designed so as to avoid impeding the movement of the cleaner body as it travels through the pool. Thus, in some prior art configurations, an exterior loop on the bag is attached to the cleaner water supply hose to constrain the bag's movement relative to the cleaner body. In other configurations, a buoyant member is positioned within the bag (e.g., U.S. Pat. No. 6,193,885) adjacent to the bag's upper end to orient the bag out of the way of the cleaner body travel path.

SUMMARY OF THE INVENTION

The present invention is directed to a pool cleaner debris bag including an enhanced means for opening and closing a bag access opening and for orienting the bag to avoid impeding the movement of a cleaner body.

A debris bag in accordance with the invention is formed of flexible water permeable material, e.g., mesh, enveloping an interior volume or cavity. A bag entrance opening is formed in the material and configured for removable attachment to an outlet port on the cleaner body. Debris from the outlet port passes through the bag entrance opening into a bag interior cavity. A bag access opening is also provided which is closed during normal cleaning operation but which can be opened by the user to access and discard debris from the interior cavity. Thereafter, the access opening can be closed and the bag entrance opening reinstalled on the cleaner body to resume normal cleaning operation.

In accordance with a significant feature of the invention, a bag closure means for selectively opening and closing the bag access opening comprises a clamp member having first and second opposed edges adapted to clamp against opposed layers of bag material to seal the bag access opening. The opposed bag layers are preferably beaded along their edges to assist in retaining the clamp member against the bag material. The closure means is configured to be sufficiently buoyant so that when immersed in water, the bag access opening is elevated above the bag entrance opening. The desired buoyancy can be readily achieved by proper selection of the structure and materials of the clamp member and/or beaded bag edges.

In a preferred embodiment, the bag clamp member comprises an integral part, preferably of plastic, defining opposed elongate first and second clamping edges. The clamp member is configured to permit its opposed clamping edges to resiliently move apart to open a slot therebetween for accepting the insertion, e.g., sliding insertion, of opposed layers of bag material proximate to the bag access opening. The resiliency between the clamping edges functions to urge them against the bag material to squeeze closed the access opening. In normal use, the outflow (water and debris) from the cleaner body flows into the bag entrance opening toward the bag access opening. The water component of the outflow will pass through the bag material while the debris component will collect in the bag as a consequence of the access opening being sealed.

In accordance with a further significant feature of one preferred embodiment of the invention, the bag is configured to permit relatively heavy debris to fall from the outflow path between the bag's entrance and access openings into a lower pouch portion of the bag. More particularly, one preferred bag embodiment in accordance with the invention includes a pouch for collecting heavy debris such as sand and pebbles. The pouch lower end is preferably configured to be retained close to the cleaner body near or below the cleaner's center of gravity, to constrain the pouch it from swinging relative to the body which could otherwise compromise the stability of the body as it travels through the pool.

In accordance with a further significant feature of a preferred embodiment, the pouch is also provided with an access opening which is useful for emptying pouch debris. The pouch access opening is preferably closed by a pouch closure means which can be structurally similar to the aforementioned bag closure means to the extent that it includes a clamp member having opposed clamping edges for squeezing against opposed layers of bag pouch material. A preferred pouch closure means further includes means for manually attaching and detaching the pouch clamp member to the cleaner body, preferably close to or below the body's center of gravity.

Debris bag embodiments in accordance with the invention can be configured to operate with top/bottom pool cleaners, of the type exemplified by aforementioned U.S. Pat. No. 6,090,219, as well as with more traditional bottom only cleaners.

BRIEF DESCRIPTION OF THE FIGURES

FIGS. 9A-9E show a modification of the clamp member of FIG. 5 comprising a depending stop member for preventing the clamp member from fully sliding off the bag;

FIG. 9F is a sectional view taken substantially along the plane 9F-9F of FIG. 9E;

DETAILED DESCRIPTION

The aforementioned U.S. Pat. Nos. 6,090,219 and 6,365,039 describe positive pressure automatic pool cleaning systems which include a cleaner body able to selectively operate in a top (water surface) mode and a bottom (wall surface) mode. When operating in the top mode, the cleaner body captures debris from the pool water surface and collects the debris in a container, e.g., a water permeable bag, carried by the cleaner body. When operating in the bottom mode, the cleaner body captures debris from the pool containment wall surface and the debris can be collected in the same debris bag.

The present invention is directed to an enhanced debris collection bag for use with a cleaner body which has both water surface and wall surface operational modes, as is generally described in the aforementioned patents, or with a cleaner body which only has a wall surface operational mode.

Figure 1:
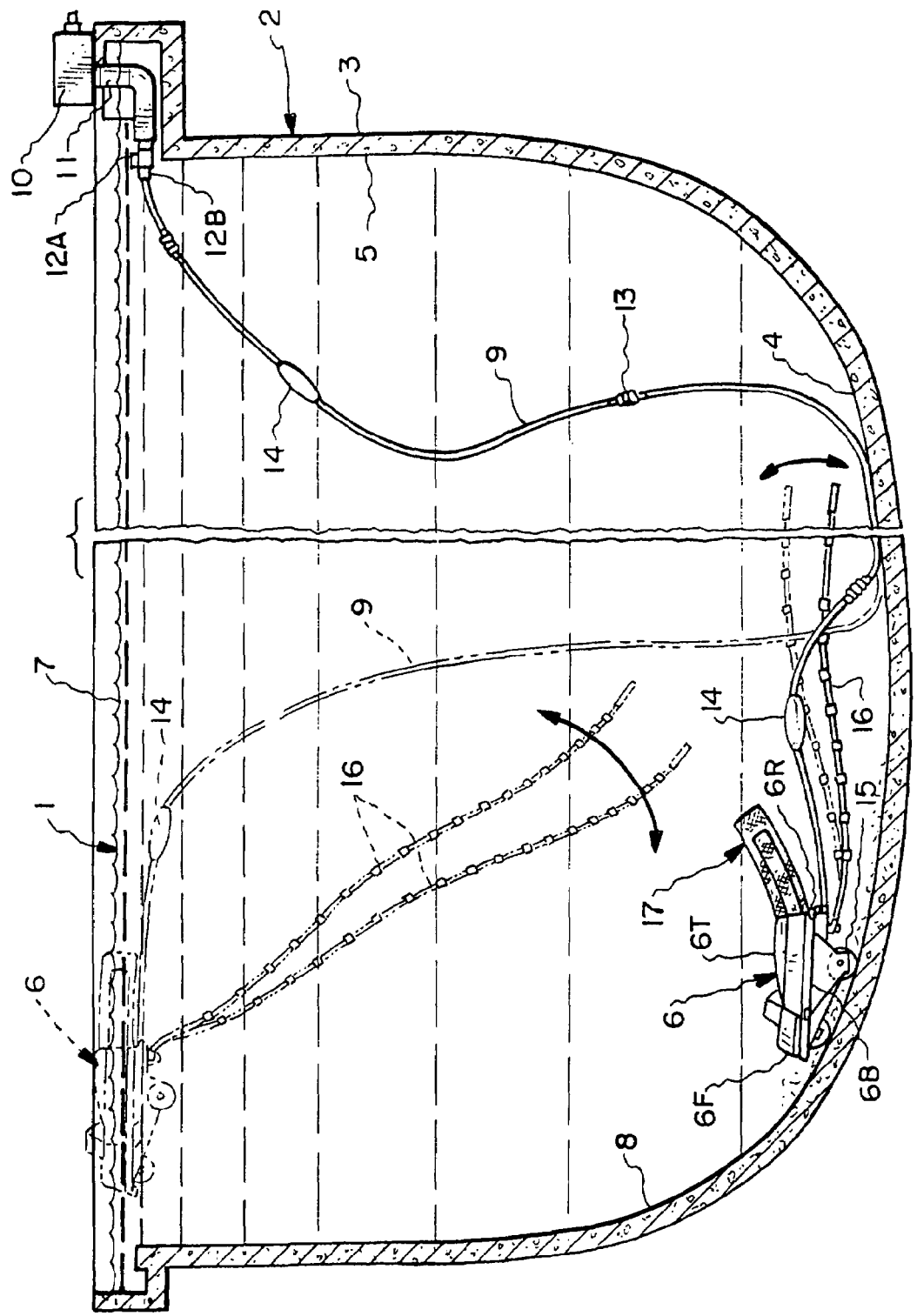
FIG. 1 is substantially identical to FIG. 1 of U.S. Pat. No. 6,090,219 and schematically depicts a positive pressure pool cleaning system including a cleaner body able to selectively operate in a top mode to capture debris from the pool water surface and a bottom mode to capture debris from the pool containment wall surface.

FIG. 1 herein duplicates FIG. 1 of U.S. Pat. No. 6,090,219 and shows an apparatus for cleaning a water pool 1 contained in an open vessel 2 defined by a containment wall 3 having bottom 4 and side 5 portions. The apparatus of FIG. 1 includes a cleaner body 6 configured for immersion in and travel through the water pool 1 for selective cleaning operation proximate to the water surface 7 (in the top cleaning mode) or proximate to the interior wall surface 8 (in the bottom cleaning mode).

The cleaner body 6 preferably comprises an essentially rigid structure having a hydrodymanically contoured exterior surface for efficient travel through the water pool. The body 6 can be variously configured but preferably is compactly formed such that it fits within a two foot cube. The cleaner body 6 can be heavier than water so that in its quiescent, unpowered, state it will sink to the containment wall surface 8 at the bottom of the pool such that a vertical force must be provided to lift the body 6 to proximate the water surface 7 for operation in the water surface cleaning mode. As noted in U.S. Pat. No. 6,090,219, the body 6 can, alternatively, be configured to be lighter than water such that in its quiescent, unpowered, state, it floats proximate to the water surface 7. When so configured, a vertical force must be provided to cause the lighter than water body to descend to operate in the bottom wall surface cleaning mode.

In either case, the vertical force required to move the body either up or down is produced as a consequence of a positive pressure water flow supplied via a flexible hose 9 from, e.g., an electrically driven motor/pump assembly 10. The assembly 10 defines a pressure side outlet 11 preferably coupled via a pressure/flow regulator 12A and quick disconnect coupling 12B to the hose 9. The hose 9 can be formed of multiple sections coupled in tandem by hose nuts and swivels 13 and can carry appropriately placed floats 14 and distributed weight.

As is explained in the aforementioned U.S. Pat. No. 6,090,219, the positive pressure water flow supplied to the cleaner body 6 via hose 9 functions to produce the vertical force for moving the body up or down, functions to propel the cleaner body along a travel path through the pool and functions to produce a water flow relative to the cleaner body for capturing debris from either the water surface (top mode) or the wall surface (bottom mode).

As represented in FIG. 1, the body 6 generally comprises a top portion or frame 6T and a bottom portion or chassis 6B, spaced in a nominally vertical direction. The body also generally defines a front or nose portion 6F and a rear or tail portion 6R spaced in a nominally horizontal direction. The body is supported on a traction means such as wheels 15 which are mounted for engaging the wall surface 8 when operating in the wall surface cleaning mode.

The body 6 in FIG. 1 typically operates alternately in (1) the water surface cleaning mode to capture floating debris and (2) the wall surface cleaning mode in which it travels along bottom and side wall portions to capture debris from the wall surface 8. The body 6 preferably tows a flexible hose 16 configured to be whipped by a water outflow from a nozzle at its free end to sweep against the wall surface 8. When operating in either mode, captured debris is collected in a debris container, e.g., bag 17, which is removably attached to the rear end of the cleaner body 6 and towed along as the body is propelled through the pool.

Figure 2:
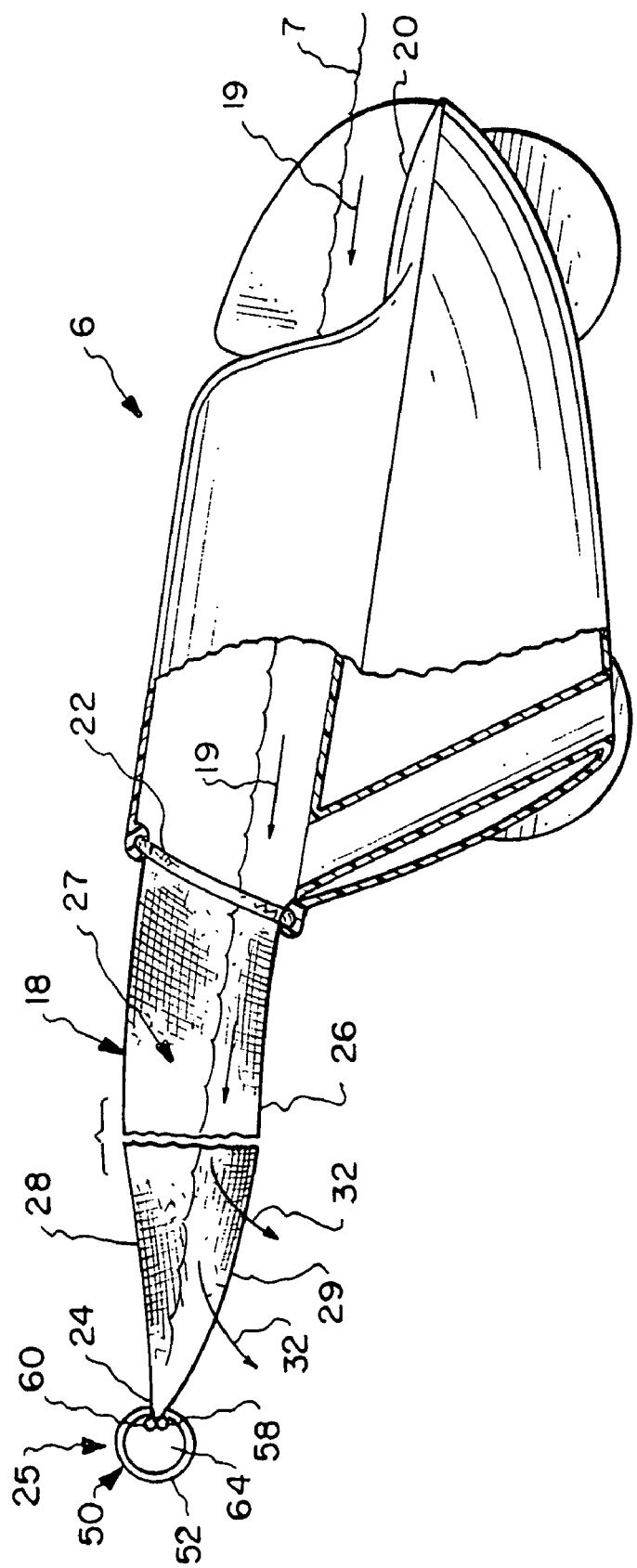
FIG. 2 is a side view partially broken away depicting an exemplary cleaner body operating at the pool water surface and having a debris bag in accordance with the invention for collecting debris captured from the water surface by the cleaner body.
Figure 3:
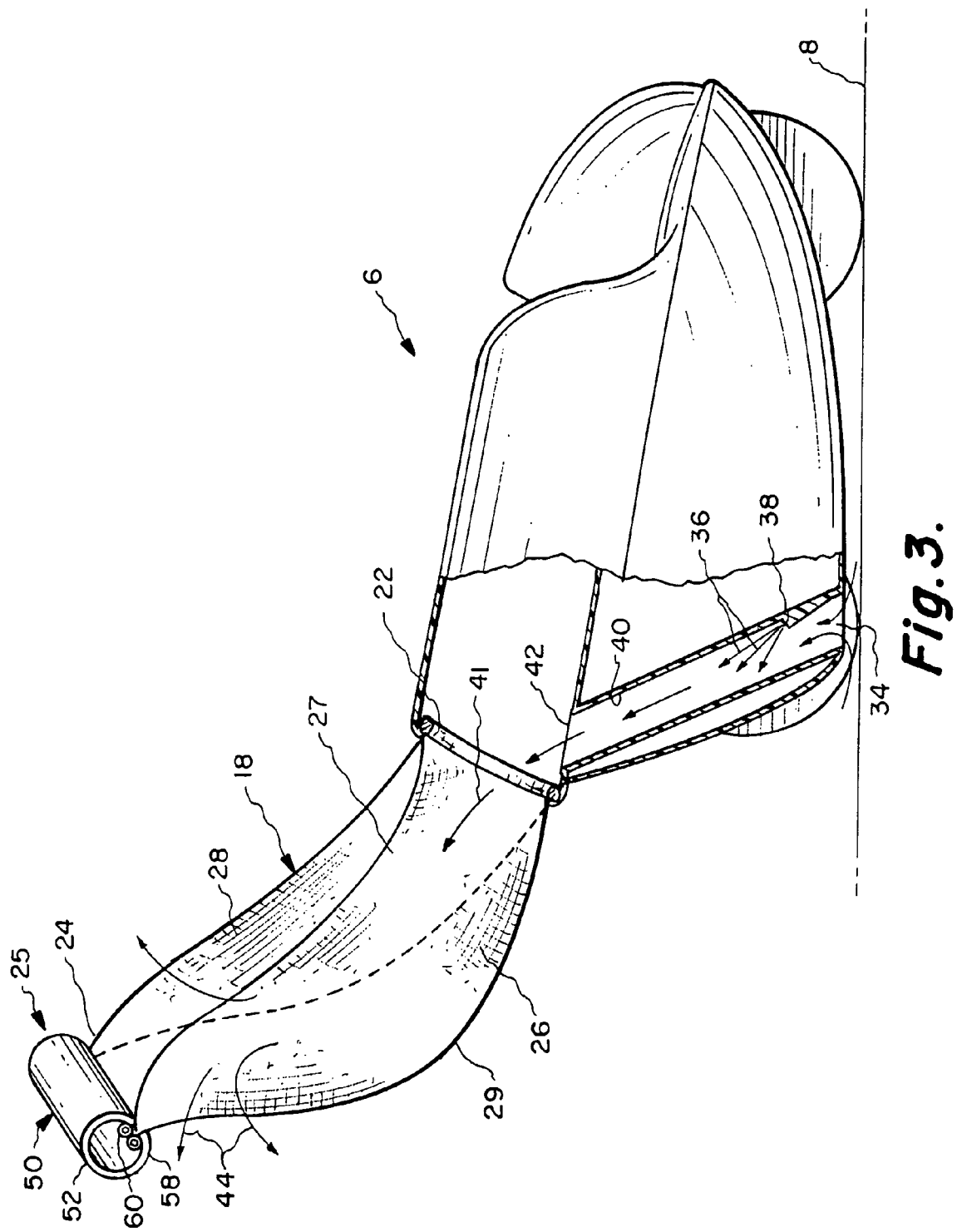
FIG. 3 is a side view depicting the cleaner body of FIG. 2 operating at the pool wall surface and showing how a buoyant bag closure means in accordance with the invention orients the debris bag.

Attention is now directed to FIGS. 2 and 3 which comprise enlarged side views of a cleaner body 6 having a debris bag 18 in accordance with the present invention removably attached thereto. FIG. 2 shows the cleaner body 6 operating at the water surface 7 (top mode) and FIG. 3 shows the cleaner body 6 operating at the wall surface 8 (bottom mode). Note that as the cleaner body 6 is propelled to the right as viewed in FIG. 2, pool surface water (represented by flow arrow 19) will move rearwardly across the cleaner's deck 20 to carry water borne debris to the entrance opening 22 of the debris bag 18 and toward an access opening 24 spaced from the entrance opening 22. The access opening 24, during operation, is closed by a closure means 25 configured in accordance with the present invention.

As will be discussed in greater detail hereinafter, the bag 18 is formed by flexible water permeable material 26, e.g., mesh, configured to envelop an interior cavity 27. The bag 18 can be loosely considered as comprising opposed upper and lower material layers 28, 29 joined by side panels to surround the cavity 27, a bottom portion containing entrance opening 22, and a top portion containing access opening 24.

With reference to FIG. 2, as the water flow 19 moves through the entrance opening 22 into the bag, the water will exit through the bag material 26, as represented by flow arrows 32, while the debris will be retained, or collected, in the bag cavity 27. Note in FIG. 2 that the closure means 25 is depicted as floating on the water surface 7 with the bag 18 essentially oriented horizontally as the cleaner body 6 is propelled along the water surface.

FIG. 3 depicts the cleaner body 6 being propelled along the containment wall surface 8 when operating in the wall surface mode. In this mode, water and debris are drawn from the wall surface 8 into a vacuum inlet 34 as a consequence of a water jet 36 discharged from nozzle 38. The water and debris drawn into vacuum inlet 34 are directed through passageway 40 producing an outflow 41 at vacuum outlet 42 which is discharged through the entrance opening 22 into the bag cavity 27. Note that the water flow entering the cavity 27 exits through the bag material 26, represented by arrows 44, leaving the debris in the bag cavity 27.

Note that FIG. 3 depicts the bag 18 inclined rearwardly from the cleaner body 6. As will be discussed hereinafter, this orientation is achieved by implementing the closure means 25 with sufficient buoyancy to elevate the access opening end of the bag above the entrance opening end attached to the cleaner body. By making the closure means 25 sufficiently buoyant, the bag 18 will assume an orientation relative to the cleaner body 6 which avoids its impeding the body's travel through the pool.

Figure 4:
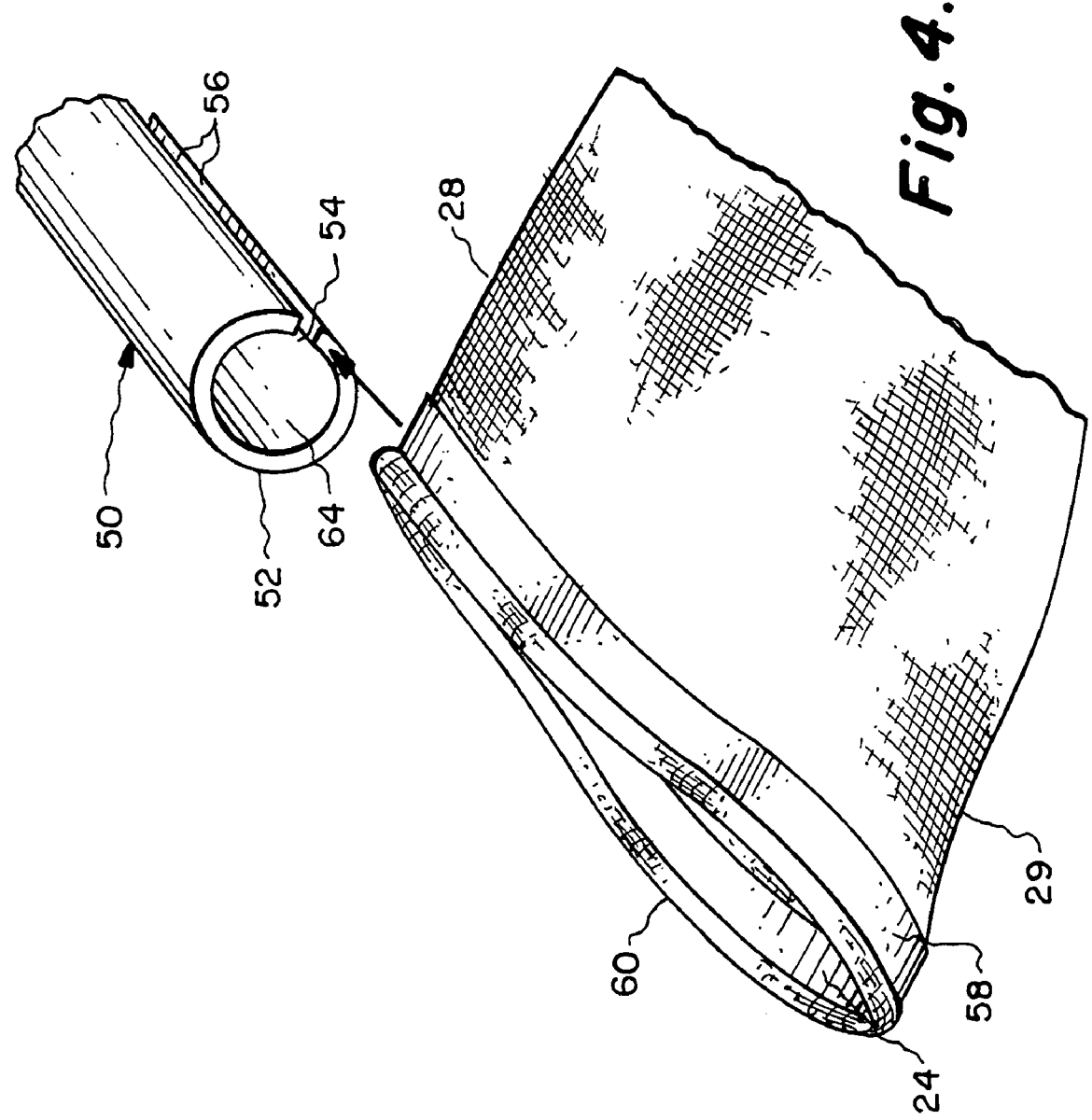
FIG. 4 is a perspective view showing a debris bag access opening and a buoyant clamp member for sliding across the opposed bag layers to close the access opening.
Figure 5:
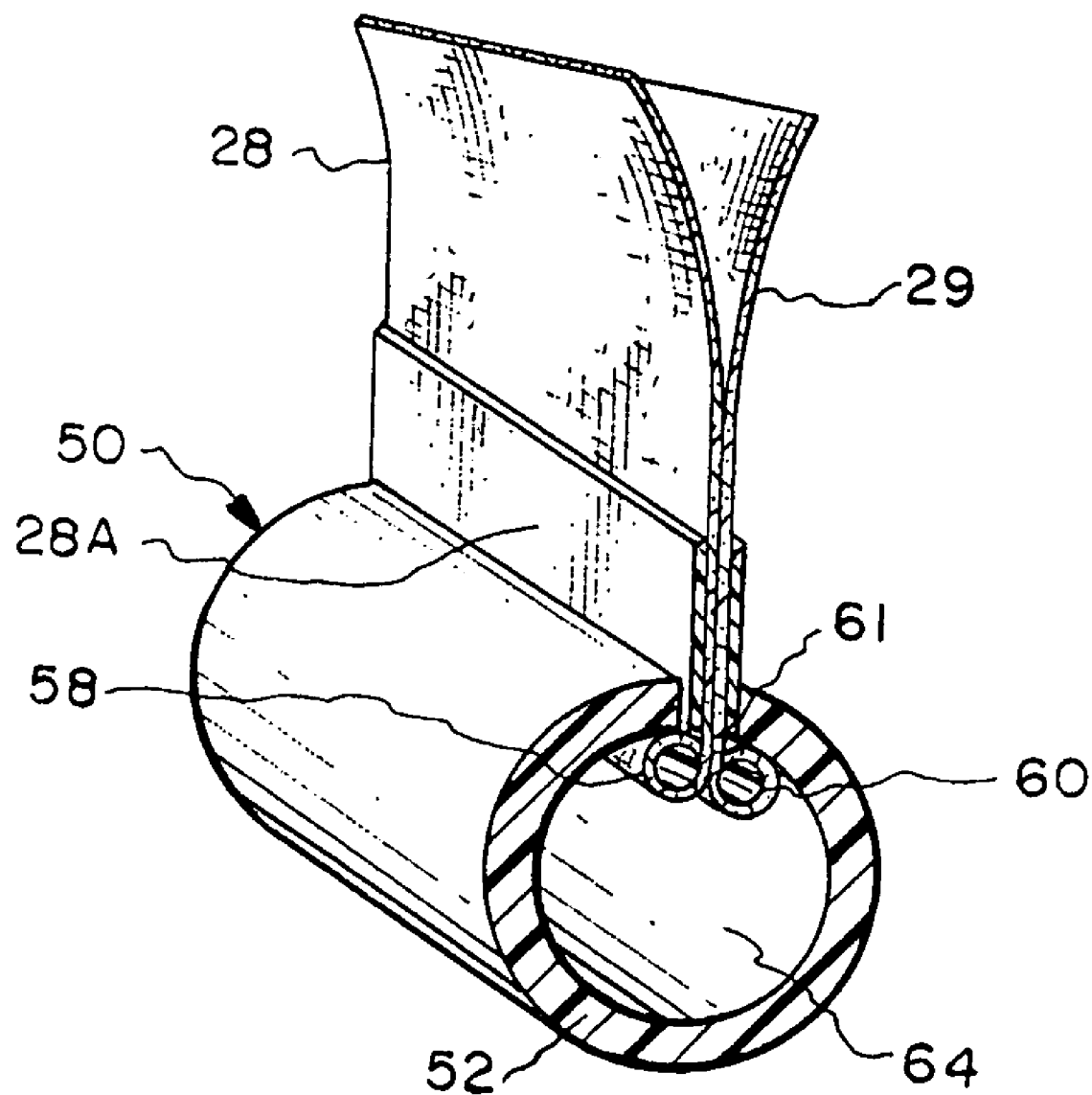
FIG. 5 is a perspective view showing how opposed edges of the clamp member clamp against the bag layers to close the access opening.

A preferred closure means 25 in accordance with the invention is depicted in FIGS. 2 and 3 and in greater detail in FIGS. 4 and 5. The closure means 25 includes a clamp member 50 defined by a substantially cylindrical peripheral wall 52. An elongate gap, or gap, 54 is formed in the wall 52 so as to define opposed clamping edges 56. The slot 54 is dimensioned to snugly slidingly receive the opposed edges of upper and lower bag layers 28, 29 adjacent the access opening 24. The clamp member 50 is constructed so that the clamping edges 56 will resiliently bear against the opposed bag layers to close the access opening 24 for retaining debris in the bag cavity during cleaner operation. When it is desired to remove and discard debris from the bag 18, the bag and clamp member 50 are slid relative to one another to provide access to the opposed edges of the bag layers allowing them to be pulled apart to open to the cavity 27.

In a preferred closure means embodiment, as depicted in FIGS. 2-5, beads 58, 60 are respectively formed along the opposed edges of bag layers 28, 29. For example with reference to FIG. 5, bead 58 is formed by folding the edge 28A of layer 28 upon itself adjacent the access opening 24 and securing bead material 61 therebetween. Bead 60 is similarly formed on layer 29.

When the clamp member 50 is slid onto the bag layers (FIG. 4), the clamping edges 56 will spread to accommodate the thickness of the bag layers resulting in the edges 56 resiliently bearing against the layers to close the access opening 24. As shown in FIGS. 2 and 3, the beads 58, 60 will be accommodated within the open elongate recess 64 within the clamp member wall 52.

The clamp member 50 is preferably constructed of plastic material which can be formed to be sufficiently resilient for the edges 56 to spread to accommodate the bag layers and to then clamp the opposed layers together to close the access opening 24 and prevent debris from exiting the cavity 27. Additionally, the clamp member material is preferably selected to be buoyant in water to elevate the access opening end of the bag above the entrance opening end removably attached to the cleaner body 6 as depicted in FIG. 3.

Figure 6:
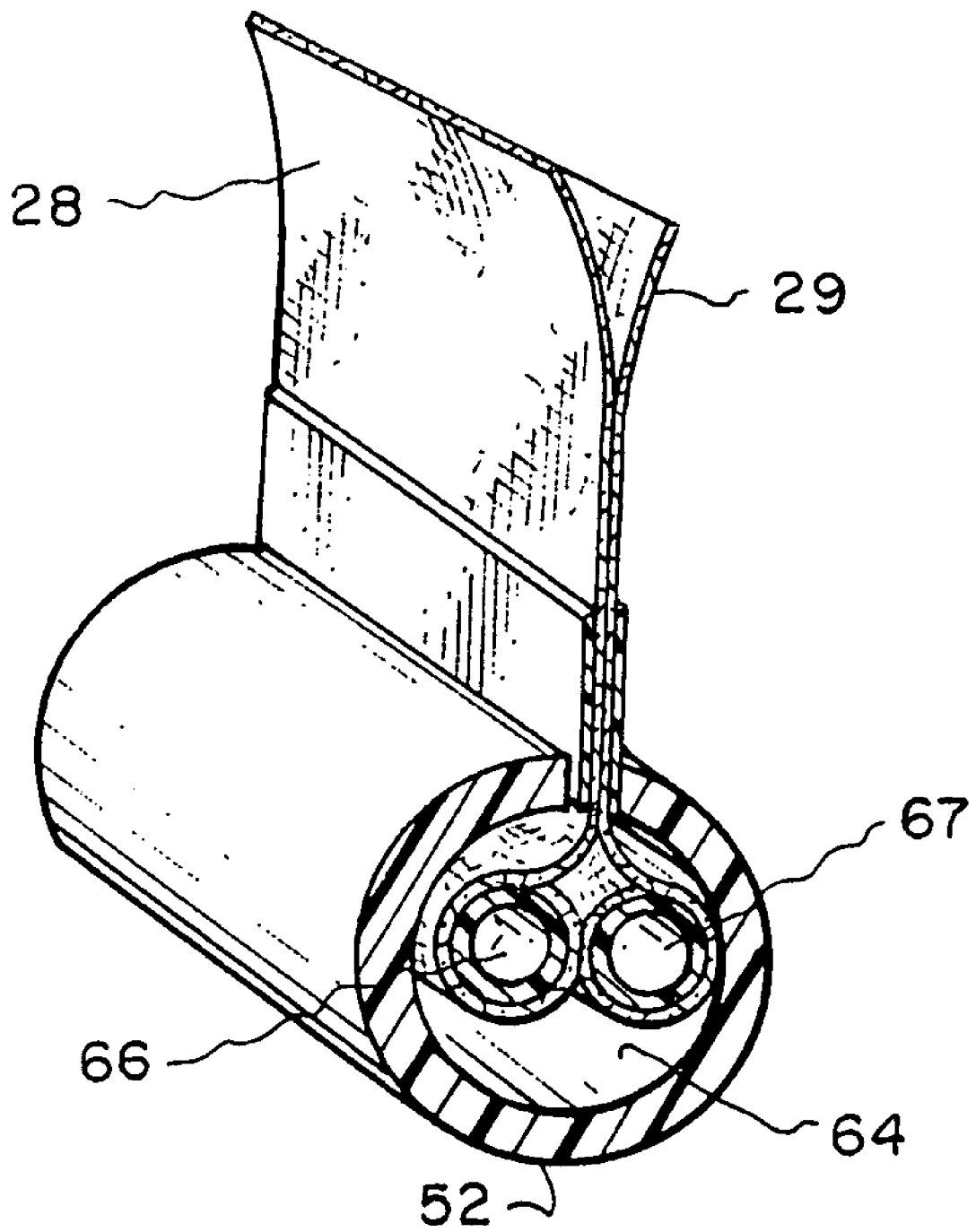
FIG. 6 is similar to FIG. 5 but shows larger beaded edges adjacent the access opening for enhancing buoyancy.

The closure means 26 can be made buoyant in various ways, e.g., by a proper choice of clamp member material and/or by configuring the clamp member with supplemental buoyancy such as closed air chambers or foam material (not shown), e.g., within the elongate recess 64. Alternatively, or supplementally, the closure means buoyancy can be enhanced by forming the edge beads 58, 60 of buoyant material. For example, beads 58 and 60 can be formed by larger diameter tubes, as shown at 66, 67 in FIG. 6, having sealed ends.

Figure 7:
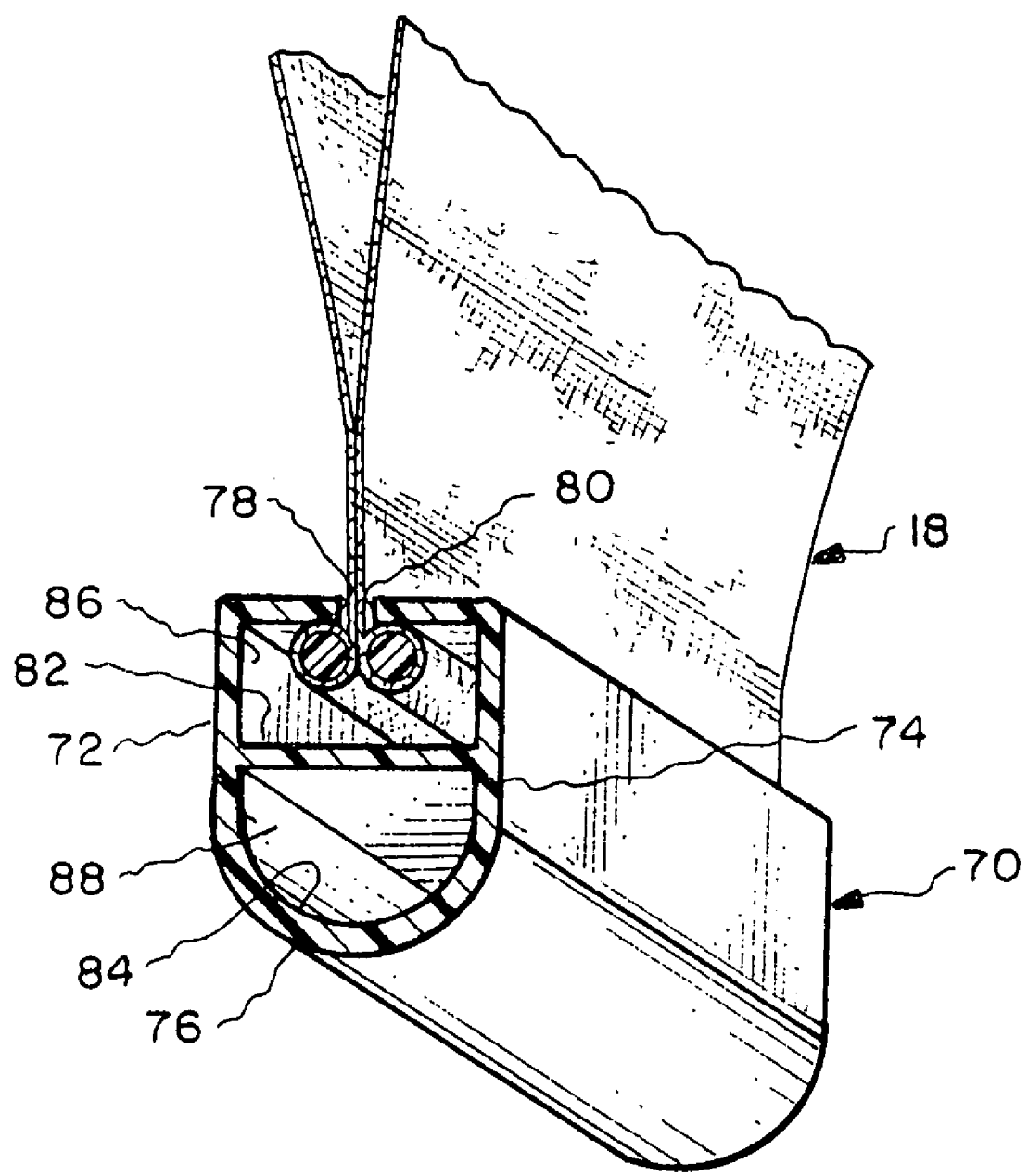
FIG. 7 is similar to FIGS. 5 and 6 but shows an alternative clamp member structure.

Attention is now directed to FIG. 7 which illustrates an alternative clamp member embodiment 70. The cross section of the clamp member 70 comprises first and second legs 72 and 74 which extend from a U shaped bight or bridge portion 76. Remote from the bight portion 76, the legs 72 and 74 turn inwardly and terminate at spaced clamping edges 78 and 80. The edges 78 and 80 are dimensioned to snugly slidingly receive opposed layers of bag material therebetween, as has been previously discussed. In the clamp member embodiment 70, a partition 82 separates an internal recess 84 into first and second recesses, or compartments, 86 and 88. As depicted, the recess 86 accommodates the beaded edges of the bag 18 adjacent to the compartment opening. The elongate recess 88 can be used to enhance buoyancy by sealing its ends to enclose an air pocket. Alternatively, the compartment 88 can be filled with foam or other buoyant material.

Figure 8:
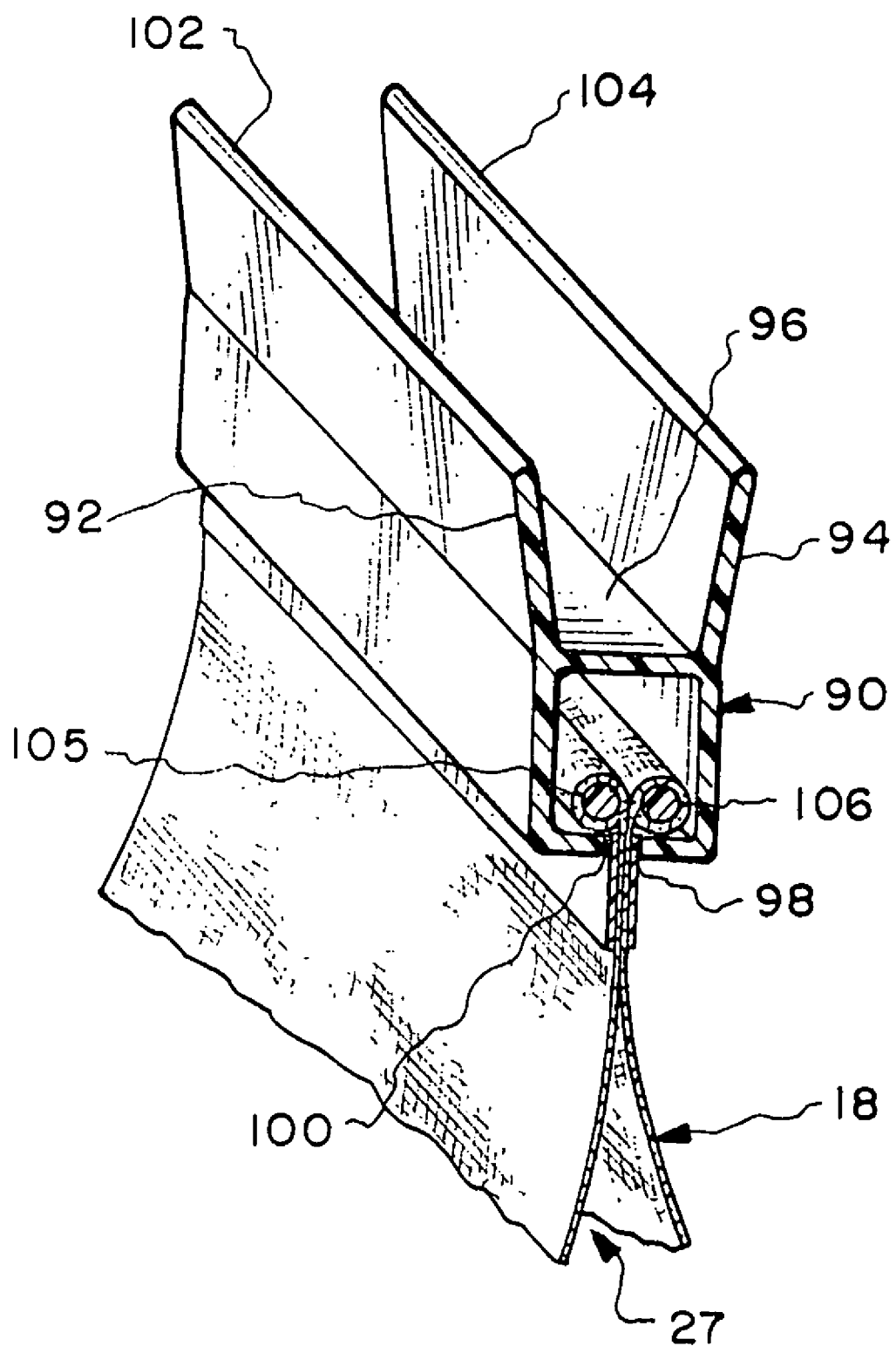
FIG. 8 is similar to FIG. 7 but shows a further alternative clamp member.

FIG. 8 depicts a further alternative clamp member embodiment 90. In cross section, the clamp member 90 includes legs 92 and 94 coupled by a partition 96. Below the partition 96 (as viewed in FIG. 8), the legs 90 and 92 turn inwardly to define clamping edges 98 and 100. The clamp member 90 is configured so that these edges 89 and 100 are normally resiliently urged toward one another for gripping layers of bag material therebetween. The legs 90 and 92 additionally extend above the partition 96 to form extensions 102 and 104 which can be manually squeezed to pivot the legs 90, 92 to spread the clamping edges 98, 100 to facilitate insertion of the bag beaded edges 105, 106 therebetween. As with the previously discussed clamp members, the clamp member 90 is constructed to be buoyant in water for the purpose of elevating the access opening end of the bag 18, as depicted in FIG. 3, when the cleaner is being operated in its wall surface cleaning mode.

The various clamp member embodiments thus far discussed are configured to define opposed clamping edges for bearing against layers of bag material to close the access opening. The clamping edges of the various embodiments can be spread to receive the bag material layers and then released to resiliently clamp against the bag material. For simplicity in construction, the elongate clamping edges can extend substantially the full length of the clamp member shell to allow the clamp member to slide onto the beaded bag edges from either end. This characteristic enables a clamp member to be fully detached from the bag thereby providing unfettered access to the bag interior cavity 27 for emptying debris therefrom. The disadvantage of constructing the clamp member so that it can be fully detached from the bag is that a user can inadvertently misplace the clamp member. If this occurred, it would disable the cleaner body from collecting debris. In order to avoid such a circumstance, a clamp member can be used which is configured to prevent inadvertent detachment from the bag as shown in FIG. 9A.

The clamp member 120 is comprised of a substantially cylindrical elongate shell 122 split along its length to define opposed clamping edges 124 and 126 separated by a gap. As is best depicted in FIGS. 9A and 9F, the shell 122 is configured to define a stop 130 which preferably extends diametrically through the shell 122 and gap 127 past clamping edges 124 and 126. Note in FIGS. 9A and 9E that the stop 130 extends only a short axial distance along the elongation of shell 122.

FIG. 9A shows the beaded edges 134, 136 of the bag 18 threaded through the gap 127. FIG. 9B shows how the depending stop 130 extends into the bag beneath the beaded edges 134 and 136. FIG. 9C shows how the bag 18 can be pulled to the left to engage the stop 130 against the bag side panel to thereby retain the shell 122 on the bag while still allowing the bag edges 134 and 136 to be spread apart to provide access to the bag interior cavity. FIG. 9D shows the bag slid back to the right relative to the shell 122 to seal the access opening between the beaded edges 134 and 136.

Figure 10:
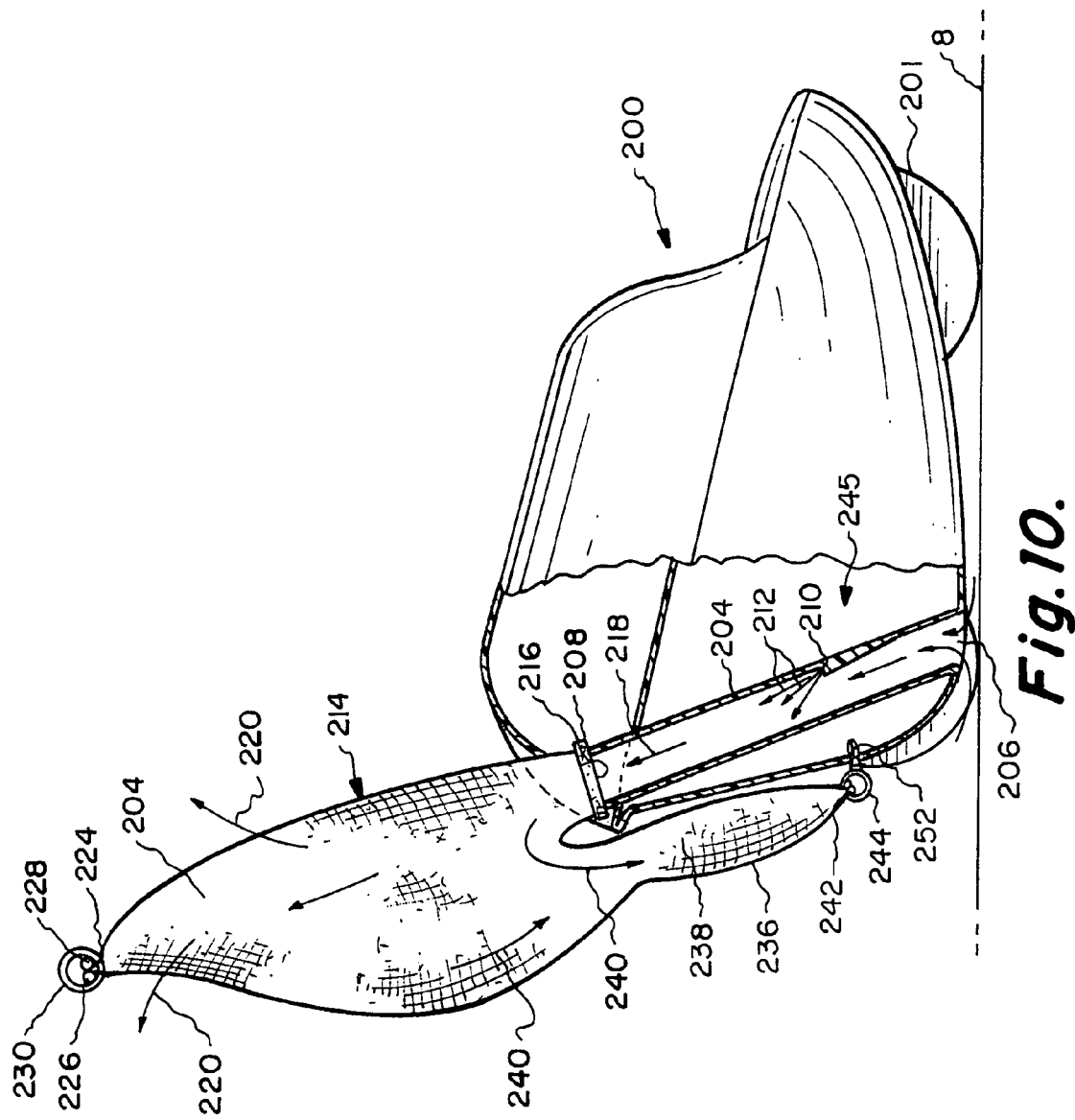
FIG. 10 is a side view of another exemplary cleaner body having a debris bag in accordance with the invention including a depending pouch for collecting heavy debris.

The debris bag 18 and the various clamp member embodiments as discussed thus far are particularly configured to operate with an automatic pool cleaner whose cleaner body is selectively operable at either the pool water surface (top mode) or the containment wall surface (bottom mode). It should be understood, however, that debris bag embodiments and closure means in accordance with the invention can also be used with a cleaner body configured for operation solely at the wall surface. Such a cleaner body 200 is depicted in FIG. 10 which shows the body supported on wheels 201 for engaging the wall surface 8. The cleaner body 200, includes an internal flow passageway 204 which at its bottom end has a vacuum inlet 206 and its top end a vacuum outlet 208. A jet nozzle 210 discharges a jet 212 into the passageway which produces a force to draw debris and water from proximate to wall surface 8 through the vacuum inlet 206 for discharge through the vacuum outlet 208.

FIG. 10 shows a debris bag 214 in accordance with the invention including an entrance opening 216 intended to be detachably secured to the upper end of passageway 204 for collecting the discharge from vacuum outlet 208. The bag 214 is formed of water permeable material so that the water component of the flow 218 entering the entrance opening 216 will exit through the bag material as represented by flow arrows 220.

FIG. 10 shows the bag as having an access opening 224 defined between beaded edges 226, 228 of opposed layers of bag material. A buoyant clamp member 230, for example of the type depicted in FIG. 5, is mounted adjacent to the beaded edges 226, 228 for closing the access opening 224.

Figure 11:
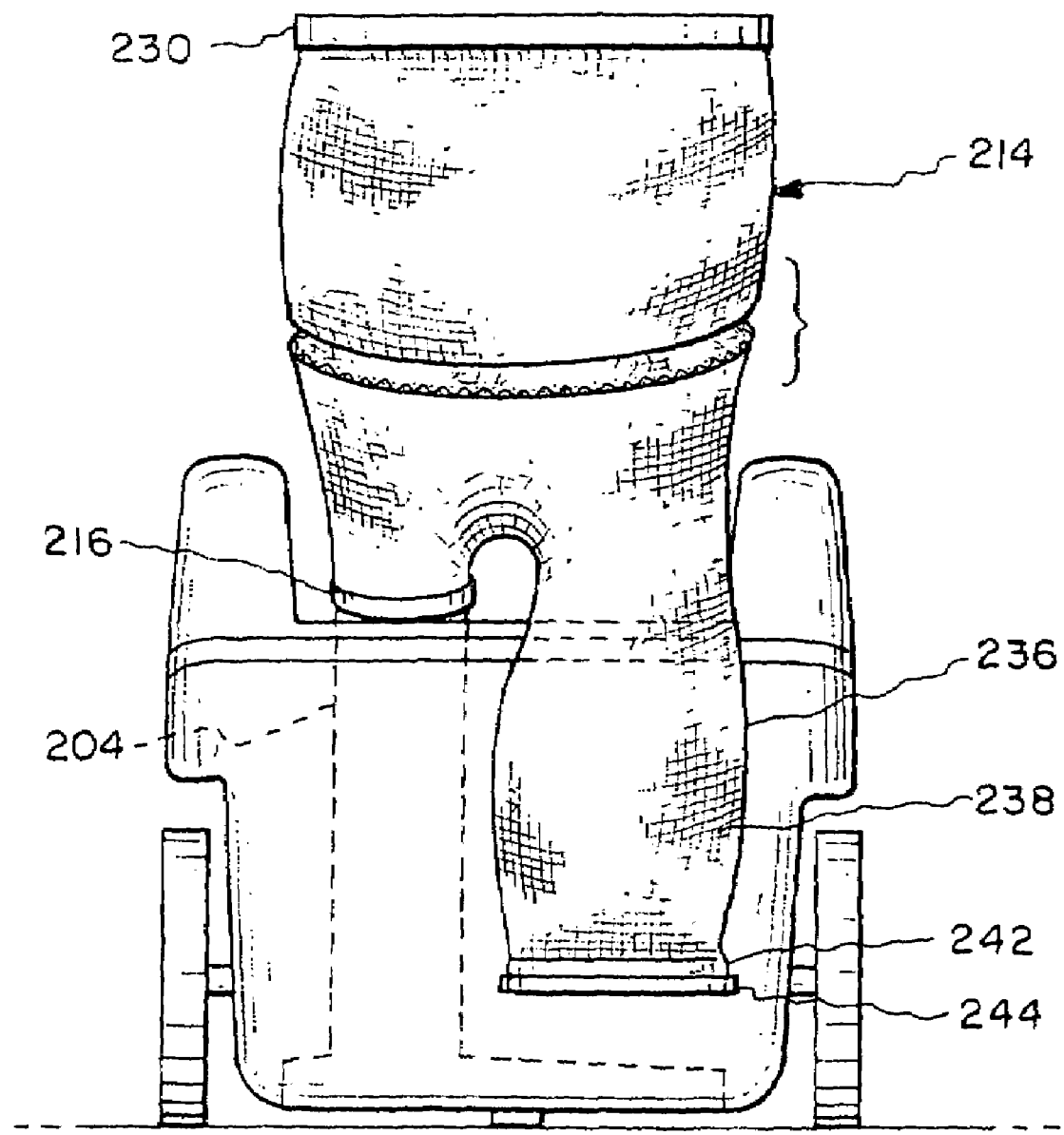
FIG. 11 is a rear view of the cleaner body and debris bag of FIG. 10.

As can best be seen in FIGS. 10 and 11, the bag 214 is configured with a small pouch 236 which extends below the bag entrance opening 216, as viewed in FIGS. 10 and 11. The pouch 236 defines an internal cavity 238 which functions to collect heavier debris, e.g., sand, pebbles, etc., drawn through the entrance opening 216 from passageway 204. More particularly, flow arrow 218 in FIG. 10 represents the flow of water and debris drawn in through vacuum inlet 206. The water component of the flow 218 exits through the water permeable bag material, as represented by flow arrows 220. The debris component of flow 218 is unable to pass through the bag material and tends to sink downwardly away from the bag access opening, as represented by the flow arrow 240. This debris 240 is collected in the pouch 236.

Figure 13:
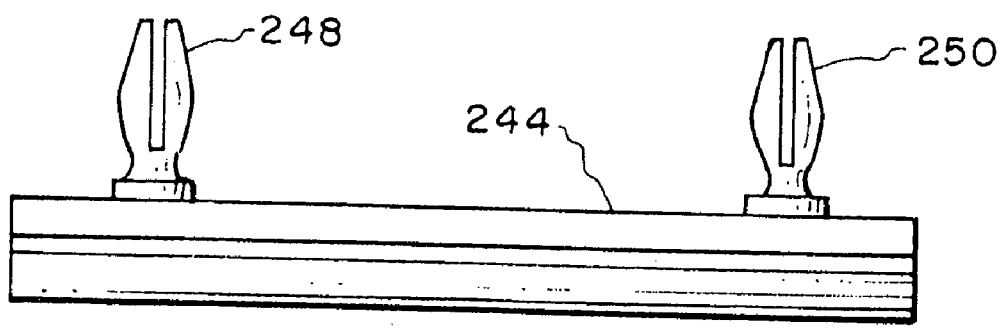
FIG. 13 is a plan view of the clamp member of FIG. 12.

In accordance with the present invention, the lower end of the pouch 236 is provided with an access opening 242 which in operation, is closed by a closure means including a clamp member 244. The structure of clamp member 244 can be similar to the various clamp member embodiments discussed in FIGS. 1-9. However, the clamp member 244 need not be buoyant. Rather, it is desirable that the lower end of the pouch 236 be attached to the cleaner body to prevent it from swinging relative to the body which could adversely effect the stability of the cleaner body as it moves along its travel path. It is preferable that the pouch lower end be attached immediately adjacent to the cleaner body close to or below the body's center of gravity 245. A preferred form of attachment is to configure clamp member 244 to snap into the cleaner body. More particularly, note in FIG. 13 that the clamp member 244 carries bifurcated plastic snaps 248, 250 which extend perpendicular to the elongation of the clamp member shell. The bifurcated snaps 248 and 250 are configured to squeeze into cleaner body openings 252 for retaining the clamp member 244 immediately adjacent to the cleaner body.

Figure 12:
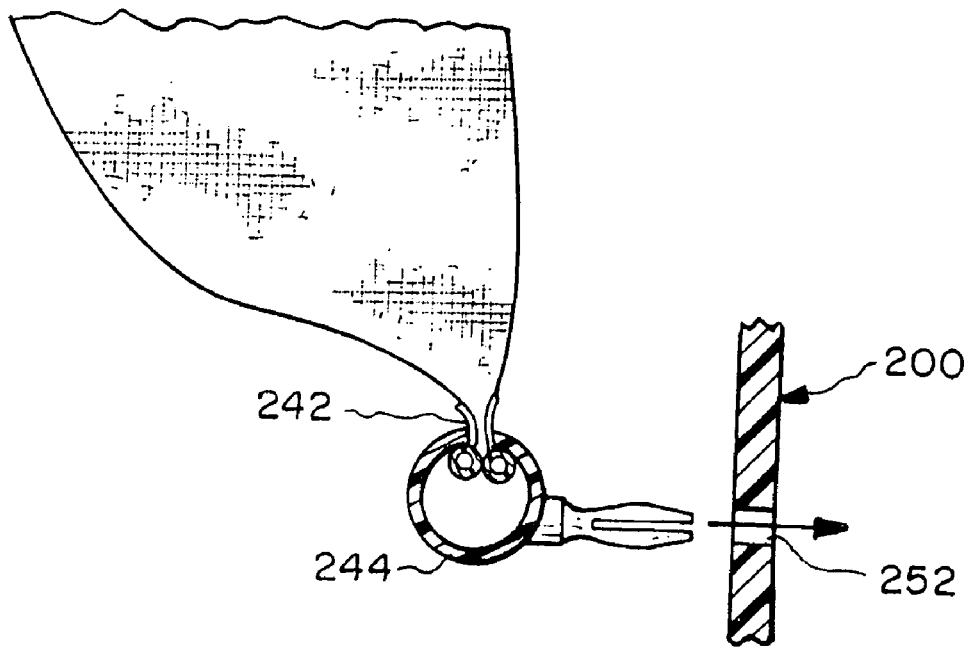
FIG. 12 is an enlarged fragmentary view showing a pouch access opening and a clamp member for closing the access opening.

In use, the clamp member 244 is mounted on the beaded edges of the bag 244 adjacent the pouch access opening 242 as shown in FIG. 12. The bifurcated snaps 248 and 250 are then snapped into corresponding openings 252 in the cleaner body 200 for retaining the pouch access end close to and low on the body 200. Of course when it is desired to remove the bag 214 for discarding collected debris, the clamp member 244 can be pulled from the cleaner body to withdraw the snaps 248, 250 from openings 252 to detach the clamp member 244 from the cleaner body. The clamp member 244 can then be released from the bag beaded edges to allow them to be pulled apart for providing access to the pouch cavity.

From the foregoing, it should now be appreciated that a pool cleaner debris bag has been described characterized by a closure means for closing a bag access opening which has sufficient buoyancy in water to orient the bag to avoid impeding cleaner travel. Although a limited number of embodiments have been described, it is recognized that variations and modification may readily occur to those skilled in the art coming within the intended scope of the appended claims.

The invention claimed is:

1. A debris container for use with an automatic swimming pool cleaner for collecting debris captured by the cleaner, said debris container comprising:
   a bag formed of water permeable material enveloping an interior cavity;
   said bag defining an entrance opening communicating with said cavity and adapted for coupling to said cleaner;
   said bag further defining an access opening for accessing and removing debris from said cavity; and
   a closure means for selectively closing said access opening to retain debris in said cavity and opening said access opening to permit removal of debris from said cavity;
   said closure means being buoyant in water.

2. The debris container of claim 1 wherein said bag includes first and second opposed layers of water permeable material defining said access opening therebetween; and wherein
   said closure means includes a clamp member for clamping together said first and second layers to close said access opening.

3. The debris container of claim 2 wherein said clamp member comprises first and second opposed edges and means for resiliently urging said edges toward one another for clamping said first and second layers therebetween to close said access opening.

4. The debris container of claim 1 wherein said closure means includes:
   an elongate clamp member having first and second opposed clamping edges resiliently urged toward one another; and wherein
   said bag includes first and second opposed layers of bag material defining said access opening therebetween; and wherein
   said clamp member opposed edges are configured to slidingly receive said bag material layers therebetween to close said access opening.

5. The debris container of claim 4 wherein said closure means further includes at least one beaded edge on said bag material layers adjacent to said access opening.

6. An automatic swimming pool cleaner including a cleaner body adapted to travel through a water pool for capturing debris and for discharging an outflow of water and debris, said cleaner comprising:
- a debris collection bag formed of water permeable material enveloping an interior primary cavity;
- said bag defining an entrance opening communicating with said primary cavity and adapted for receiving said outflow from said cleaner body;
- said bag further defining an access opening communicating with said primary cavity for accessing and removing debris from said primary cavity;
- a closure means for selectively closing said access opening to retain debris in said primary cavity;
- said bag further defining a depending pouch enveloping an interior pouch cavity in communication with said primary cavity for collecting relatively heavy debris therefrom; and
- means for attaching a lower end of said depending pouch to said cleaner body to prevent relative movement therebetween.

7. The cleaner of claim 6 wherein said means for attaching said pouch to said cleaner body includes means for manual attachment and manual detachment.

8. The cleaner of claim 6 wherein said closure means includes a clamp member having first and second opposed edges; and
- means for pressing said edges toward each other to clamp bag material therebetween to close said access opening.

9. The cleaner of claim 6 further including a pouch access opening communicating with said pouch cavity; and
- a pouch clamp member configured to close said pouch access opening.

10. The cleaner of claim 9 wherein said pouch clamp member includes first and second opposed edges; and
- means for pressing said edges toward each other to clamp bag material therebetween to close said pouch access opening.

11. The cleaner of claim 6 wherein said closure means is buoyant in water for elevating said bag access opening relative to said bag entrance opening.

12. A debris bag adapted for use with an automatic swimming pool cleaner for collecting debris captured by the cleaner in the course of traveling through a water pool, said bag comprising:
- a quantity of flexible water permeable material configured to define opposed layers enveloping a primary cavity;
- an entrance opening defined by said material adapted for coupling to said cleaner for passing a flow of water and debris into said primary cavity;
- an access opening defined by said material remote from said entrance opening; and
- closure means for cooperating with said material proximate to said access opening for closing said access opening to retain debris in said primary cavity; and wherein
- said closure means is configured to be buoyant in water to elevate said bag material proximate to said access opening above said entrance opening.

13. The bag of claim 12 wherein said closure means includes a clamp member having first and second opposed edges; and
- means for pressing said edges toward each other to clamp said opposed layers therebetween to close said access opening.

14. The bag of claim 13 wherein said closure means further includes at least one beaded edge on said bag material layers adjacent to said access opening.

15. The bag of claim 12 further including a pouch defined by said material enveloping a pouch cavity in communication with and depending from said primary cavity for collecting heavy debris therefrom.

16. The cleaner of claim 15 further including a pouch access opening communicating with said pouch cavity; and
- a pouch clamp member configured to close said pouch access opening.

17. The cleaner of claim 16 including means for attaching a lower end of said pouch to said cleaner to prevent relative movement therebetween.

* * * * *